Figures 1, 2, 3:
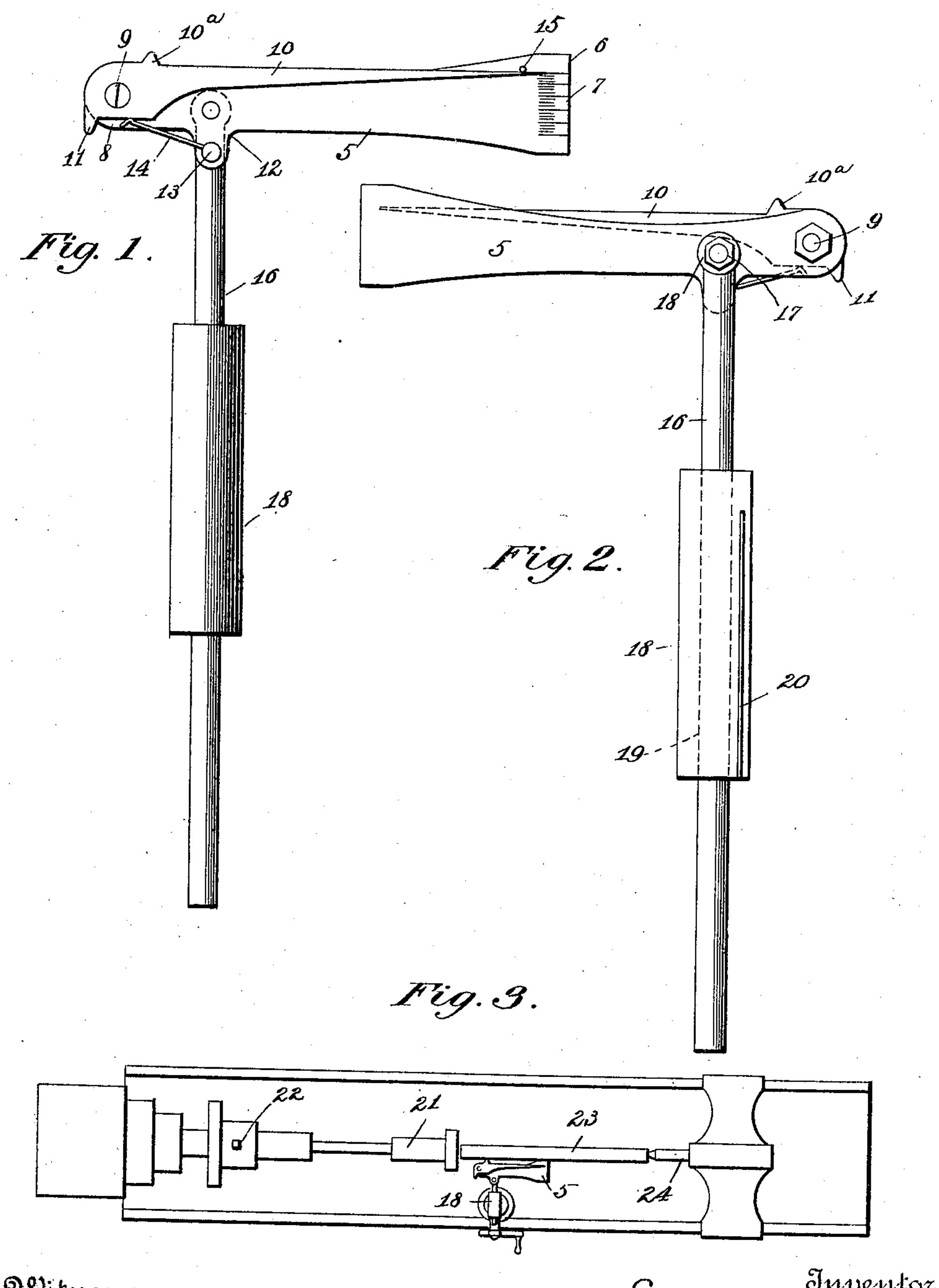

(No Model.)

E. H. BYER.

GAGE.

No. 595,370. Patented Dec. 14, 1897.

Witnesses
Edw. D. Duvall Jr
Copeland P. Jones

Inventor
Edgar H. Byer
by Chandlee & Chandlee
Attorneys.

THE NORRIS PETERS CO., PHOTO-LITHO., WASHINGTON, D. C.

UNITED STATES PATENT OFFICE.

EDGAR H. BYER, OF HAGERSTOWN, MARYLAND.

GAGE.

SPECIFICATION forming part of Letters Patent No. 595,370, dated December 14, 1897.

Application filed March 17, 1896. Serial No. 583,587. (No model.)

*To all whom it may concern:*

Be it known that I, EDGAR H. BYER, a citizen of the United States, residing at Hagerstown, in the county of Washington, State of Maryland, have invented certain new and useful Improvements in Gages; and I do hereby declare the following to be a full, clear, and exact description of the invention, such as will enable others skilled in the art to which it appertains to make and use the same.

My invention relates to gages in general, and more particularly to that particular class employed in determining the wabble of a revolving body, and is particularly adapted for employment as a lathe-tool to determine the wabble of a piece of material revolving between the centers of the lathe.

Referring to the drawings forming a portion of this specification and in which like symbols indicate similar parts in the several views, Figure 1 is a top plan view of the gage and attaching medium. Fig. 2 is a plan view of the under side of the tool and attaching medium; and Fig. 3 is a plan view of a lathe provided with a chuck in which is held a piece of material, said view also showing my improved supplemental tail center and the position of the gage with respect thereto.

In constructing a gage in accordance with my invention I first construct a dial-plate 5, having a broad end 6, provided with a scale 7 on its upper face. The opposite narrowed end 8 is perforated to receive a screw 9, which forms a bearing for an index-finger 10, journaled thereon and extending so that its point will move in proximity with the scale 7. At either side of the index-finger 10 and adjacent the pivot 9 are hardened projections $10^a$ and 11, equally distant from the axle of rotation of the finger 10.

The dial-plate 5 is provided at one side with a laterally-projecting lug, which lug is perforated to receive the bolt 13, which said bolt is passed through an alining perforation in a supporting-rod 16 and is provided with a jam-nut 17 and washer 18, through the medium of which jam-nut the plate 5 may be pivotally adjusted with respect to the supporting-rod and may be clamped firmly in place thereon. A slot is formed in the head of the bolt 13, in which slot is arranged a spring 14, which engages the edges of the index-finger and holds the latter so that its point will normally register "0" on the scale of the plate and will lie against the stop 15.

A clamping-block 18′, comprising a rectangular piece of spring metal provided with a longitudinal perforation 19 and a similarly-formed slot 20, the latter extending part way of the length of the block, is slipped over the rod 16 and is adapted for insertion into the tool-post of the ordinary machine-lathe, the usual clamping-screw being then turned down to compress the said block and hold the supporting-rod in a predetermined position.

The operation of my device is as follows: A piece of material having been placed in the lathe and it being desirable to ascertain whether such material is accurately centered, my gage is gripped in the tool-post, as before explained, and by means of the adjusting-screw on the carriage the point $10^a$ is caused to move into the path of said material, when, if the latter is out of alinement, the index-finger 10 will be given a partial rotation and its point will indicate upon the scale 7 the amount of wabble of the material.

It will be readily understood that when a cylindrical surface is to be engaged by the point $10^a$ the dial-plate should lie at right angles to the supporting-rod 16.

If it be desired to detect the wabble of the face of a piece of material at right angles to the axes of revolution, the dial-plate and finger are rotated until they coincide in direction with the rod 16, when the point 11 or the point $10^a$ may be brought into contact with the material, as preferred, as the case may necessitate.

It will be readily understood that my tool may be employed for determining the wabble of internal surfaces as well as external surfaces, it being necessary only that the dial-plate be revolved to the correct position and that the location of the tool-post be correct.

In Fig. 3 I have shown a method of determining the wabble of a piece of material without causing direct engagement of the index-finger therewith. This is accomplished in the following manner: A piece of material 21 being firmly gripped by chuck 22, a supplemental tail center 23, having its forward extremity pointed and its lateral extremity recessed, is gripped between the tail center 24 of the lathe and the adjacent end of the material 21, the pointed extremity of the supplemental tail center 23 engaging the center of the material. The gage is then manipulated to cause its index-finger to lie in the path of the supplemental tail center, when the effect will be the same as if the tool were in engagement with the material held in the chuck.

It will be readily understood that the particular form and arrangement of parts herein shown may be varied without departing from the spirit of my invention and that I may employ any material that may prove suitable.

Having now described my invention, what I claim is—

1. In a device of the class described the combination with a dial-plate pivotally supported intermediate of its ends, of an index-finger pivoted to the dial-plate, one of said ends being arranged to traverse a dial on the plate, the other end of said finger having projections extending beyond opposite sides of the plate whereby the dial-plate and finger may be inserted within a body for the purposes set forth.

2. In a device of the class described comprising a dial-plate having a supporting-bar pivoted thereto intermediate of its ends, a movable clamping-block on said bar, and an index-finger pivoted to the plate, one end of said finger being adapted to traverse a dial on the plate, a projection on the finger intermediate of its dial end and pivot and a second projection on the finger beyond its pivot, for the purpose set forth.

In testimony whereof I affix my signature in presence of two witnesses.

EDGAR H. BYER.

Witnesses:
FRANK E. BALDWIN,
WILLIAM H. BOYD.